(12) United States Patent
Martz et al.

(10) Patent No.: US 7,425,594 B2
(45) Date of Patent: Sep. 16, 2008

(54) COPOLYMER OF GLYCIDYL ESTER AND/OR ETHER WITH POLYOL

(75) Inventors: Jonathan T. Martz, Glenshaw, PA (US); Stephen J. Thomas, Aspinwall, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 401 days.

(21) Appl. No.: 11/286,721

(22) Filed: Nov. 23, 2005

(65) Prior Publication Data

US 2007/0117938 A1 May 24, 2007

(51) Int. Cl.
*C08G 65/22* (2006.01)
*C08L 33/14* (2006.01)
*C08L 71/08* (2006.01)

(52) U.S. Cl. .......... 525/187; 525/107; 525/108; 525/119; 525/124; 525/157; 525/162; 525/163; 525/165; 525/176; 525/178; 525/183; 525/403; 525/404; 525/405; 525/406; 525/407; 525/408; 525/420; 525/421; 525/423; 525/424; 525/425; 525/426; 525/427; 525/428; 525/430; 525/431; 525/432; 525/434; 525/435; 525/436; 525/437; 525/438; 525/440.01; 525/440.02; 525/444; 525/445; 525/446; 525/452; 525/453; 525/454; 525/455; 525/456; 525/457; 525/474; 525/476; 525/479; 525/509; 525/513; 525/514; 525/518; 525/519; 525/523; 525/528; 525/529; 525/530; 525/531; 528/405

(58) Field of Classification Search .............. None
See application file for complete search history.

(56) References Cited

U.S. PATENT DOCUMENTS

| 4,314,918 A | 2/1982 | Birkmeyer ............ 260/60 |
| 5,051,492 A | 9/1991 | Andre et al. |
| 6,069,203 A | 5/2000 | Henry et al. |
| 6,491,845 B1 * | 12/2002 | Schile ............ 252/182.24 |

FOREIGN PATENT DOCUMENTS

| EP | 0 449 358 A2 | 10/1991 |
| EP | 0 375 078 B1 | 5/1995 |
| JP | 6-80600 A * | 3/1994 |
| WO | WO 99/21906 | 5/1999 |

OTHER PUBLICATIONS

Chemical abstracts registry No. 26761-45-5 for Cardura E 10P, 1967, one page.*
Chemical abstracts registry No. 165169-07-3 for Desmodur N 3400, 1967, one page.*
Chemical abstracts registry No. 182016-37-1 for Desmodur Z 4470, 1967, one page.*
Product Bulletin: Cardura E10P Based Polyols As Reactive Diluents For Acrylic Epoxy and Polyester Resins; Mar. 2002.

* cited by examiner

*Primary Examiner*—Robert Sellers
(74) *Attorney, Agent, or Firm*—Donald R. Palladino

(57) ABSTRACT

A copolymer and a process of making the copolymer are disclosed. The copolymer is produced from reacting a glycidyl ester and/or ether with a polyol comprising a functionality of at least 2 wherein at least 50% by weight of the copolymer comprises a minimum of 3n+X repeating units, wherein n is a monomer unit and X is a monomer unit and/or other reactant. The copolymer may also include less than 50% of the polymeric units having the same molecular weight. The present invention is further directed to processes for preparing the copolymer and to coating compositions employing the copolymer.

24 Claims, No Drawings

COPOLYMER OF GLYCIDYL ESTER AND/OR ETHER WITH POLYOL

TECHNICAL FIELD

The present invention relates to copolymers produced from reacting a glycidyl ester and/or ether with a polyol, to a method for making such copolymers and to the use of the copolymers in coating compositions

BACKGROUND OF THE INVENTION

In the field of coatings, there has been an increased interest in providing high solids coating compositions having low VOC's to comply with environmental controls. In an effort to develop such coatings, reactive diluents having lower molecular weights and low viscosity have been used to replace some of the high molecular weight, high viscosity polymers typically used in coatings. For instance, glycidyl esters have been reacted with polyols to form adducts having a very narrow molecular weight distribution, i.e., <1.10. In some instances, the glycidyl esters have been reacted with a polyols at a ratio ranging from 1:0.4 to 1:2.0 moles of polyol to glycidyl ester. These compositions are typically used to produce coating compositions that have relatively low VOC's and low viscosity to satisfy environmental regulations, however, the low molecular weight components produce coatings with compromised final film properties such as tackiness. As such, there is a need for a film-forming polymer that is of relatively high molecular weight, which still can be used to formulate high solids coating compositions with low VOCs.

SUMMARY OF THE INVENTION

The present invention is directed to a copolymer produced from reacting a glycidyl ester and/or ether with a polyol comprising a functionality of at least 2 wherein at least 50% by weight of the copolymer comprises a minimum of 3n+X repeating units, wherein n is a monomer unit and X is a monomer unit and/or other reactant.

The present invention is also directed to process for preparing a copolymer comprising reacting in a molar ratio of at least 3:1, a glycidyl ester and/or ether with a polyol having a functionality of at least 2 to form a copolymer wherein at least 50% by weight of the copolymer comprises a minimum of 3n+X repeating units, wherein n is a monomer unit and X is a monomer unit and/or other reactant.

Also contemplated by the present invention is a coating composition employing the inventive copolymer. Such a coating composition comprises the inventive copolymer containing functional groups and a curing agent having functional groups reactive with the functional groups of the copolymer.

DETAILED DESCRIPTION

The present invention is directed to a copolymer for use in coating compositions. The copolymer of the present invention is the reaction product of a glycidyl ester and/or ether with a polyol.

In one embodiment, a glycidyl ester, such as the glycidyl ester of a C5-C12 aliphatic acid, is used. In another embodiment a glycidyl ether, such as the glycidyl ether of a C5-C12 aliphatic alcohol, is used. Illustrative of a glycidyl ester is a monglycidyl ester of a branched carboxylic acid such as pivalic acid and versatic acid. One such material is commercially available as CARDURA E10.

The polyol reacted with the glycidyl ester and/or ether is one that has a functionality ranging from 2 to 16. In one embodiment, the polyol functionality is from 2 to 5. Polyols of varying molecular weights may be used. In another embodiment, the polyol has a number average molecular weight (Mn) of less than 300. Some examples of such polyols include neopentyl glycol, 2-ethyl-1,3 hexane diol, cyclohexane dimethanol, trimethyolpropane, tris(hydroxyethyl)isocyanurate, and pentaerythritol.

In certain embodiments, the molar ratio of glycidyl ester and/or ether:polyol is at least 3:1. For instance, ratios of 3:1, 4:1, and 5:1 are typical as well as any variation thereof, i.e., 2.8:0.18.

The reaction can be carried out in the presence of a catalyst. One such catalyst is stannous octoate. If the catalyst is used, it is present in an amount sufficient to accelerate the reaction of the glycidyl ester with the polyol. The catalyst is typically used in an amount ranging from 0.01% to 1.0% based on the total weight of the reactants.

The copolymers produced by way of the reaction recited above have a molecular weight distribution, defined as the ratio of the weight average molecular weight, Mw, to the number average molecular weight, Mn, that is greater than 1.10. The molecular weight distribution is dependent on the properties and functionality of the polyol used in the reaction. The following Table 1 illustrates the relationship between the molar ratios of polyol to glycidyl ester and the resultant molecular weight distribution (Mw/Mn) of the copolymer.

TABLE 1

| Polyol(s) | Functionality | Moles of polyol | Moles of Glycidyl Ester | Mw | Mn | Mw/Mn |
|---|---|---|---|---|---|---|
| NPG | 2 | 1 | 3 | 1174 | 882 | 1.33 |
| NPG | 2 | 1 | 4 | 1372 | 1036 | 1.32 |
| 2-Et-1,3-HD | 2 | 1 | 3 | 1132 | 817 | 1.39 |
| 2-Et-1,3-HD | 2 | 1 | 4 | | | |
| 1,4-CHDM | 2 | 1 | 3 | 1277 | 788 | 1.62 |
| 1,4-CHDM | 2 | 1 | 4 | | | |
| Unoxol 3,4-diol | 2 | 1 | 3 | | | |
| Unoxol 3,4-diol | 2 | 1 | 4 | | | |
| TMP | 3 | 1 | 3 | 1146 | 938 | 1.22 |
| TMP | 3 | 1 | 4 | | | |
| THEIC | 3 | 1 | 3 | | | |
| THEIC | 3 | 1 | 4 | 1436 | 1023 | 1.40 |
| Pentaerythritol | 4 | 1 | 3 | | | |
| Pentaerythritol | 4 | 1 | 4 | 1373 | 1140 | 1.20 |
| 1,4-CHDM/TMP | 2.5 | 1 | 3 | 1273 | 721 | 1.77 |
| 2-Et-1,3-HD/TMP | 2.5 | 1 | 3 | 1166 | 828 | 1.41 |
| Boltorn H20 | 16 | 0.18 | 2.8 | | | |
| Boltorn H20 | 16 | 0.2 | 2.4 | 2940 | 1277 | 2.30 |

Table 1 above details a particular trend of the foregoing reaction that the greater the functionality of the polyol and/or the greater the molar ratio of gycidyl ester to polyol, the higher the molecular weight distribution. The polyols shown in Table 1 are specific polyols that may be used in the practice of the invention and are cited for illustrative purposes only. Other polyols are satisfying the features set forth above are also contemplated.

In one embodiment of the present invention, the copolymer has a $M_n$ of at least 500 g/mol. In other embodiments, the copolymer may also have a hydroxyl value of 50 to 300 such that it can cross-link with a curing agent when used in a coating formulation. In some embodiments, a molar ratio of gycidyl ester and/or ether:polyol is greater than or equal to 3:1 and the polyol has a functionality of at least 2. In this embodiment, the resultant copolymer comprises 50% by weight of the copolymer having a minimum of 3n+X repeating units, wherein n is the molecular weight of the glycidyl ester and or ether monomer unit, and X is the molecular weight of the polyol monomer unit. "Other reactant" includes such things as adducts and/or low molecular weight residues formed during the reaction. Determining if the copolymer has a minimum of 3n+X repeating units can be accomplished by analyzing its GPC data. For example, consistent with Example 1 below, a copolymer can be formed from the reaction of 3 moles of CARDURA E with 1 mole of neopentyl glycol. In order to achieve greater than 50% of the copolymer having a minimum of 3n+X repeating units, at least 50% of the reaction product must have a molecular weight greater than 824 g/mole which correlates to 3 moles of CARDUA E at a $M_w$ of 240 g/m to 1 mole of neopentyl glycol at a $M_w$ of 104 g/m. As shown by GPC data, 9 peaks are present where at least 4 of the peaks have a peak molecular weight greater than 824 g/mole. These peaks comprise 60.98% of the total makeup of the copolymer. As such, it is shown that Example 1 satisfies having greater than 50% of the copolymer having a minimum of 3n+X repeating units as described above.

In yet another embodiment, the copolymer has less than 50% polymeric units having the same molecular weight. That is, there is no single peak in the GPC result that has an area percentage greater than 50% of the total peaks. Again, this can also be determined by analyzing the GPC data of the copolymer. Looking to the GPC results of Example 1, for illustrative purposes, of the 9 peaks, the greatest area percentage peak is at a molecular weight of 804 g/mole. This peak has an area percentage of 27.73%, which is substantially less than 50%.

The present invention is also directed to coating compositions including the inventive copolymer described herein. A coating composition according to the present invention includes the copolymer and a curing agent having functional groups reactive with the copolymer. In some embodiments, curing agents may be selected from any of a variety of art-recognized curing agents, provide the curing agent comprises functional groups which are reactive with the functional groups of the copolymer. For example, suitable curing agents can include, but are not limited to aminoplasts, polyisocyanates, including blocked isocyanates, polyepoxides, beta-hydroxyalkylamides, polyacids, anhydrides, organometallic acid-functional materials, polyamines, polyamides, polyols, polyurea, urea, dicyandiamide, and mixtures of any of the foregoing. It should be understood that the blocked isocyanates can be blocked using any of the blocking agents known in the art for this purpose. For example, the blocking agents can include, but are not limited to suitable monoalcohols, phenolic compounds, glycol ethers, oximes, lactams, heterocyclic amines, imidazoles, and/or amnes. Note that the terms "curing agent" and "crosslinking agent" may be used interchangeably.

The coating compositions described herein may include an additional component, such as a form filming resin, having reactive functional groups, which can react with the curing agent. The additional component may be selected from any of a variety of polymers well-known in the art. The additional components may be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of additional components is also contemplated for use with the copolymer described herein.

The coating composition according to the present invention can further include conventional additives such as pigments, fillers and other coating additives such as flow agents, uv absorbers and the like.

In some embodiments, the coatings can include colored pigments and the like for use as a color coat. In other embodiments, the coatings may be used as a clear coat.

In one embodiment, the coating composition comprises two components. Component one includes the copolymer of the present invention and may include any additional component having reactive groups as described above. The second component may include the curing agent. The curing agent in a two component system need not be blocked. The two components are mixed just prior to application of the coating. A catalyst can be added to either the first or second component. The catalyst enhances the reaction of the first component with the curing agent upon mixing of the components. Such catalysts are well known to those in the art.

In another embodiment, the coating comprises one component. In the one component system, the copolymer and curing agent are mixed as a single component. Additional hydroxyl containing polymers may be added and are described above. In the one component system, the curing agent should be one that is not reactive with the copolymer or additional hydroxyl containing polymer at room temperature but is reactive at elevated temperatures. Examples of such curing agents are blocked polyisocyanates and aminoplasts. A catalyst may also be used in the one component system.

The compositions can be applied by conventional means including brushing, dipping, flow coating, spraying and the like, but they are most often applied by spraying. Further, after application of the compositions to the substrate, the coating is allowed to cure. Curing can be accomplished at room temperature or at elevated temperature. In some embodiments, the compositions are given a solvent flash. Curing techniques will be apparent to one of skill in the art in view of this disclosure.

Coating compositions according to the present invention including the inventive copolymer can be formulated to have low VOC's such as less than or equal to 3.5 lb/gal. In addition, the compositions can be formulated to a viscosity suitable for spray applications. In certain embodiments, suitable spray viscosity is typically less than or equal to 60 cps.

As used herein, unless otherwise expressly specified, all numbers such as those expressing values, ranges, amounts or percentages may be read as if prefaced by the word "about", even if the term does not expressly appear. Any numerical range cited herein is intended to include all sub-ranges subsumed therein. Plural encompasses singular and vice versa. For example, the reactants in the present invention are described as "a" glycidyl ester and/or ether and "a" polyol, however, mixtures of glycidyl ester with glycidyl ether as well as mixtures of polyols is also contemplated. Furthermore, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Examples 1-18 that follow illustrate various glycidyl-polyol reaction products. In the following Examples, the GPC data was obtained by analyzing the sample in a Water'Alliance 2695 GPC with a refractive index detector. The column was a PL Gel mixed E column commercially available from Waters Coporation having a place of business in Milford, Mass. 01757. The GPC was used to determined the weight average molecular weight, Mw and the number average molecular weight Mn. The polydispersity was calculated by dividing the Mw by the MN. The actual data derived from the GPC is supplied for Example 1. The properties for the remaining Examples was calculated in the same manner, however, the GPC data has been omitted.

Example 1

A reaction vessel equipped with stirrer, thermocouple, condenser and nitrogen inlet was charges with 104.1 g (1.0 mole) neopentyl glycol, 720.2 g (3.0 moles) CARDURA E10P (from Hexion Specialty Chemicals) and 0.828 g stannous octoate and heated to 130° C. The reaction exothermed to 141° C. The reaction temperature was raised to 150° C. and the contents were stirred until the epoxy equivalent weight was greater than 13,000.

The resultant product had an epoxy equivalent of 58,000, a timed bubble tube viscosity of 61.8 sec, an APHA color of 50-60, a hydroxyl value of 192.6 mg KOH/g The following are the results of the GPC data for this copolymer:

| Peak Molecular Weight | % Area |
| --- | --- |
| 1631 | 7.34 |
| 1469 | 9.38 |
| 1252 | 18.34 |
| 1027 | 25.92 |
| 804 | 27.73 |
| 559 | 8.78 |
| 461 | 1.29 |
| 348 | 0.69 |
| 185 | 0.53 |

The copolymer had a weight average molecular weight (Mw) of 1174, a number average molecular weight (Mn) of 882 and polydispersity of 1.3 in THF.

Example 2

A reaction vessel equipped with stirrer, thermocouple, condenser and nitrogen inlet was charged with 52.0 g (0.5 mole) neopentyl glycol, 479.4 g (2 moles) CARDURA E10P and 0.531 g stannous octoate and heated to 130° C. The reaction exothermed to 144° C. The reaction temperature was raised to 150° C. and the contents were stirred until the epoxy equivalent weight was greater than 13,000.

The resultant product had an epoxy equivalent of 223,600, a timed bubble tube viscosity of 89.6 sec, an APHA color of 50-60. a hydroxyl value of 155.9 mg KOH/g; had a peak molecular weight of 1147, a weight average molecular weight of 1372, a number average molecular weight of 1036 and polydispersity of 1.3 in THF.

Example 3

A reaction vessel equipped with stirrer, thermocouple, condenser and nitrogen inlet was charged with 131.8 g (0.9 mole) 2-ethyl-1,3-hexanediol, 647.6 g (2:7 moles) CARDURA E10P and 0.792 g stannous octoate and heated to 130° C. The reaction exothermed to 139° C. The reaction temperature was raised to 150° C. and the contents were stirred until the epoxy equivalent weight was greater than 13,000.

The resultant product had an epoxy equivalent of 25,873, a timed bubble tube viscosity of 38.8 sec, an APHA color of 50-60, a hydroxyl value of 152.4 mg KOH/g; had a peak molecular weight of 835, a weight average molecular weight of 1132, a number average molecular weight of 817 and polydispersity of 1.4 in THF.

Example 4

A reaction vessel equipped with stirrer, thermocouple, condenser and nitrogen inlet was charged with 117.3 g (0.8 mole) 2-ethyl-1,3-hexanediol, 767.4 g (3.2 moles) CARDURA E10P and 0.889 g stannous octoate and heated to 130° C. The reaction exothermed to 145° C. The reaction temperature was raised to 150° C. and the contents were stirred until the epoxy equivalent weight was greater than 13,000.

The resultant product had an epoxy equivalent of 15,948, a timed bubble tube viscosity of 65.8 sec, an APHA color of 50-60, a hydroxyl value of 143.9 mg KOH/g.

Example 5

A reaction vessel equipped with stirrer, thermocouple, condenser and nitrogen inlet was charged with 115.3 g (0.8 mole) 1,4-cyclohexane dimethanol, 576.1 g (2.4 moles) CARDURA E10P and 0.691 g stannous octoate and heated to 130° C. The reaction exothermed to 143° C. The reaction temperature was raised to 150° C. and the contents were stirred until the epoxy equivalent weight was greater than 13,000.

The resultant product had an epoxy equivalent of 35,854, a timed bubble tube viscosity of 3 min 18.8 sec, an APHA color of 100-150, a hydroxyl value of 174.4 mg KOH/g; had a peak molecular weight of 1320, a weight average molecular weight of 1277, a number average molecular weight of 788 and polydispersity of 1.6 in THF.

Example 6

A reaction vessel equipped with stirrer, thermocouple, condenser and nitrogen inlet was charged with 93.8 g (0.65 mole) 1,4-cyclohexane dimethanol, 624.2 g (2.6 moles) CARDURA E10P and 0.721 g stannous octoate and heated to 130° C. The reaction exothermed to 146° C. The reaction temperature was raised to 150° C. and the contents were stirred until the epoxy equivalent weight was greater than 13,000.

The resultant product had an epoxy equivalent of 18,055, a timed bubble tube viscosity of 3 min 2.6 sec, an APHA color of 70-80, a hydroxyl value of 156.5 mg KOH/g.

Example 7

A reaction vessel equipped with stirrer, thermocouple, condenser and nitrogen inlet was charged with 115.2 g (0.8 mole) Unoxol 3,4-diol (a mixture of 1,3-dimethylolcyclohexane and 1,4-dimethylolcyclohexane from Dow Chemical), 576.0 g (2.4 moles) CARDURA E10P and 0.69 g stannous octoate and heated to 130° C. The reaction exothermed to 136° C. The reaction temperature was raised to 150° C. and the contents were stirred until the epoxy equivalent weight was greater than 13,000.

The resultant product had an epoxy equivalent of 17,161, a timed bubble tube viscosity of 4 min 17.6 sec, an APHA color of 50-60, a hydroxyl value of 131.2 mg KOH/g.

Example 8

A reaction vessel equipped with stirrer, thermocouple, condenser and nitrogen inlet was charged with 93.4 g (0.65 mole) Unoxol 3,4-diol (from Dow Chemical), 623.8 g (2.6 moles) CARDURA E10P and 0.718 g stannous octoate and heated to 130° C. The reaction exothermed to 141° C. The reaction temperature was raised to 150° C. and the contents were stirred until the epoxy equivalent weight was greater than 13,000. An additional 0.32 was added to accelerate the reaction.

The resultant product had an epoxy equivalent of 44,406, a timed bubble tube viscosity of 2 min 27.5 sec, an APHA color of 200-250, a hydroxyl value of 177.3 mg KOH/g.

Example 9

A reaction vessel equipped with stirrer, thermocouple, condenser and nitrogen inlet was charged with 114.1 g (0.85 mole) trimethylolpropane, 612.0 g (2.55 moles) CARDURA E10P and 0.0.731 g stannous octoate and heated to 130° C. The reaction exothermed to 138° C. The reaction temperature was raised to 150° C and the contents were stirred until the epoxy equivalent weight was greater than 13,000.

The resultant product had an epoxy equivalent of 18,202, a timed bubble tube viscosity of 2 min 45.4 sec, an APHA color of 40-50, a hydroxyl value of 231.8 mg KOH/g; had a peak molecular weight of 878, a weight average molecular weight of 1146, a number average molecular weight of 938 and polydispersity of 1.2 in THF.

Example 10

A reaction vessel equipped with stirrer, thermocouple, condenser and nitrogen inlet was charged with 93.9 g (0.7 mole) trimethylolpropane, 672.2 g (2.8 moles) CARDURA E10P and 0.778 g stannous octoate and heated to 130° C. The reaction exothermed to 141° C. The reaction temperature was raised to 150° C. and the contents were stirred until the epoxy equivalent weight was greater than 13,000. An additional 0.32 g of stannous octoate was added to accelerate the reaction.

The resultant product had an epoxy equivalent of 24,023, a timed bubble tube viscosity of 3 min 10.1 sec, an APHA color of 40-50, a hydroxyl value of 203.4 mg KOH/g.

Example 11

A reaction vessel equipped with stirrer, thermocouple, condenser and nitrogen inlet was charged with 195.7 g (0.75 mole) trishydroxyethyl isocyanurate, 540.1 g (2.25 moles) CARDURA E10P and 0.745 g stannous octoate and heated to 130° C. The reaction exothermed to 138° C. The reaction temperature was raised to 165° C. and the contents were stirred until the epoxy equivalent weight was greater than 13,000.

The resultant product had an epoxy equivalent of 81,182, a timed bubble tube viscosity of 17 min 14.1 sec, an APHA color of >500, a hydroxyl value of 202.7 mg KOH/g.

Example 12

A reaction vessel equipped with stirrer, thermocouple, condenser and nitrogen inlet was charged with 117.5 g (0.6 mole) trishydroxyethyl isocyanurate, 648.2 g (2.4 moles) CARDURA E10P and 0.778 g stannous octoate and heated to 130° C. The reaction exothermed to 138° C. The reaction temperature was raised to 165° C. and the contents were stirred until the epoxy equivalent weight was greater than 13,000.

The resultant product had an epoxy equivalent of 19,203, a timed bubble tube viscosity of 12 min 34.6 sec, an APHA color of >500, a hydroxyl value of 178.3 mg KOH/g; had a peak molecular weight of 1370, a weight average molecular weight of 1436, a number average molecular weight of 1023 and polydispersity of 1.4 in THF.

Example 13

A reaction vessel equipped with stirrer, thermocouple, condenser and nitrogen inlet was charged with 115.8 g (0.75 mole) pentaerythritol, 661.3 g (2.55 moles) CARDURA E10P and 0.718 g stannous octoate and heated to 130° C. The reaction exothermed to 138° C. The reaction temperature was gradually raised to 180° C. to get the pentaerythritol to dissolve and the contents were stirred until the epoxy equivalent weight was greater than 13,000.

The resultant product had an epoxy equivalent of 84,833, a timed bubble tube viscosity of 7 min 14.3 sec, an APHA color of 100-150, a hydroxyl value of 272.9 mg KOH/g.

Example 14

A reaction vessel equipped with stirrer, thermocouple, condenser and nitrogen inlet was charged with 88.4 g (0.65 mole) pentaerythritol, 623.3 g (2.4 moles) CARDURA E10P and 0.718 g stannous octoate and heated to 130° C. The reaction exothermed to 138° C. The reaction temperature was gradually raised to 180° C. to get the pentaerythritol to dissolve and the contents were stirred until the epoxy equivalent weight was greater than 13,000.

The resultant product had an epoxy equivalent of 68,000, a timed bubble tube viscosity of 4 min 47.1 sec, an APHA color of 50-60, a hydroxyl value of 219.0 mg KOH/g; had a peak molecular weight of 1477, a weight average molecular weight of 1373, a number average molecular weight of 1140 and polydispersity of 1.2 in THF.

Example 15

A reaction vessel equipped with stirrer, thermocouple, condenser and nitrogen inlet was charged with 36.1 g (0.25 mole) 1,4-cyclohexane dimethanol, 33.5 g (0.25 mole) trimethylolpropane, 360.2 g (1.50 moles) CARDURA E10P and 0.408 g stannous octoate and heated to 130° C. The reaction exothermed to 133° C. The reaction temperature was raised to 150° C. and the contents were stirred until the epoxy equivalent weight was greater than 13,000.

The resultant product had an epoxy equivalent of 33,018, a timed bubble tube viscosity of 3 min 45.4 sec, an APHA color of 30-40; had a peak molecular weight of 1222, a weight average molecular weight of 1273, a number average molecular weight of 721 and polydispersity of 1.8 in THF.

Example 16

A reaction vessel equipped with stirrer, thermocouple, condenser and nitrogen inlet was charged with 292.3 g (2.0 mole) 2-ethyl-1,3-hexanediol, 268.2 g (2.0 mole) trimethylolpropane, 2881.0 g (12.0 moles) CARDURA E10P and 3.179 g stannous octoate and heated to 130° C. The reaction exothermed to 141° C. The reaction temperature was raised to 150° C. and the contents were stirred until the epoxy equivalent weight was greater than 13,000.

The resultant product had an epoxy equivalent of 18,044, a timed bubble tube viscosity of 88.0 sec, an APHA color of 20-30 and density of 8.29 lb/gal; had a peak molecular weight of 1199, a weight average molecular weight of 1166, a number average molecular weight of 828 and polydispersity of 1.4 in THF.

Example 17

A reaction vessel equipped with stirrer, thermocouple, condenser and nitrogen inlet was charged with 312.5 g (0.18 moles) Boltorn H20 dendritic polyol (from Perstorp Polyols, Inc.), 711.8 g (2.82 moles) Glydexx N-10 (from Exxon Chemical) and 1.02 g stannous octoate and heated to 130° C. The reaction exothermed to 139° C. The reaction temperature was raised to 150° C. and the contents were stirred until the epoxy equivalent weight was greater than 13,000.

The resultant product had a 110° C./1 h solids content of 98.2%, a Brookfield viscosity of 25680 centipoise, a hydroxyl value of 298.1 mg KOH/g and a weight average molecular weight of 3045 and number average molecular weight of 1281 in THF.

Example 18

A reaction vessel equipped with stirrer, thermocouple, condenser and nitrogen inlet was charged with 357.5 g (0.22 moles) Boltorn H20 dendritic polyol (from Perstorp Polyols, Inc.), 609.5 g (2.41 moles) Glydexx N-10 (from Exxon Chemical) and 0.97 g stannous octoate and heated to 130° C. The reaction exothermed to 139° C. The reaction temperature was raised to 150° C. and the contents were stirred until the epoxy equivalent weight was greater than 13,000.

The resultant product had a 110° C./1 h solids content of 98.7%, a Brookfield viscosity of 22570 centipoise, a hydroxyl value of 234.4 mg KOH/g and a weight average molecular weight of 2940 and number average molecular weight of 1277 in THF.

Examples 19-22 that follow illustrate the preparation of various hydroxyl containing acrylic polymers.

Example 19

A reaction vessel equipped with stirrer, addition funnels with pumps, thermocouple, condenser and nitrogen inlet was charged with 490.0 g PM acetate and heated to reflux (144° C.). Two feeds, identified herein as A and B, were added gradually and simultaneously over a period of three hours while the contents of the vessel were maintained at reflux conditions. Feed A consisted of a mixture of 43.3 g PM acetate and 120.1 g of a 50% solution of t-butyl peroctoate in mineral spirits. Feed B consisted of 250.1 g methyl methacrylate, 319.8 g styrene, 136.9 g butyl methacrylate, 67.1 g butyl acrylate, 100.0 g hydroxyethyl methacrylate, 102.0 g hydroxypropyl methacrylate, 17.0 g of the monomer from 1/1 mole ratio of acrylic acid and CARDURA E10P and 7.0 g acrylic acid. After the addition of the two feeds A and B were complete, the funnels were rinsed with 19.3 g PM acetate, the vessel contents were allowed to reflux for an additional 15 minutes. Then an additional feed consisting of 38.5 g PM acetate and t-butyl peroctoate were added over 30 minutes. The funnel was rinsed with 28.9 g PM acetate and vessel contents were refluxed another 30 minutes. Thereafter, heating was discontinued, 28.9 g PM acetate added and the contents of the vessel allowed to cool it to ambient temperature.

The resultant product had a total solids content measured for 1 hour at 110° C. of 58.82% by weight; a timed bubble tube viscosity of 24.2 seconds; an acid value of 4.25 mg KOH/g; residual contents of methyl methacrylate, butyl methacrylate, hydroxyethyl methacrylate and hydroxypropyl methacrylate, respectively, of 0.15%, 0.12%, 0.12% and 0.28% by weight; had a peak molecular weight of 7452, a weight average molecular weight of 7878 and a number average molecular weight of 2230 in THF.

Example 20

A reaction vessel equipped with stirrer, addition funnels with pumps, thermocouple, condenser and nitrogen inlet was charged with 489.28 g CARDURA E10P and heated to 200° C. The feed consisted of 619.86 g styrene, 536.30 g hydroxypropyl methacrylate, 484.2 g methyl methacrylate, 123.20 g acrylic acid, 11.46 g triphenyl phosphite and 40.00 g di-t-butyl peroxide was added gradually and simultaneously over a period of two hours while the contents of the vessel were maintained at 205° C. After addition was complete, the vessel contents were stirred for 15 minutes, cooled to ambient temperature accompanied by the addition of 563.22 g n-propyl propionate.

The resultant product had a total solids content measured for 1 hour at 110° C. of 73.80% by weight, bubble tube viscosity of Z5+; an acid value of 1.13 mg KOH/g; a hydroxyl value of 112.2 mg KOH/g; an APHA color of 80; residual contents of styrene, hydroxypropyl methacrylate, methyl methacrylate and CARDURA E10P, respectively, of 0.07%, 0.65%, 089% and 1.07% by weight; had a peak molecular weight of 1793, a weight average molecular weight of 2564 and a number average molecular weight of 910 in THF.

Example 21

A reaction vessel equipped with stirrer, addition funnels with pumps, thermocouple, condenser and nitrogen inlet was charged with 620.1 g CARDURA E10P and heated to 200° C. Two feeds, identified herein as A and B, were added gradually and simultaneously over a period of two hours while the contents of the vessel were maintained at 200-205° C. The feed A consisted of 836.9 g styrene, 653.7 g hydroxyethyl methacrylate, 653.7 g methyl methacrylate, 166.3 g acrylic acid and 15.0 g triisodecyl phosphite. Feed B consisted of 52.1 g di-t-butyl peroxide. After addition was complete, the vessel contents were stirred for 15 minutes, cooled to ambient temperature accompanied by the addition of 760.1 g n-propyl propionate.

The resultant product had a total solids content measured for 1 hour at 110° C. of 74.94% by weight; a timed bubble tube viscosity of 3 minutes 22.8 seconds; an acid value of 0.21 mg KOH/g; a density of 8.81 lb/gal; an APHA color of 20-30.

Example 22

A reaction vessel equipped with stirrer, addition funnels with pumps, thermocouple, condenser and nitrogen inlet was charged with 846.2 g PM acetate and heated to reflux (145° C.). Two feeds, identified herein as A and B, were added gradually and simultaneously over a period of three hours 35 minutes and three hours, respectively, while the contents of the vessel were maintained at reflux conditions. Feed A consisted of a mixture of 85.0 g PM acetate and 336.3 g of a 50% solution of t-butyl peroctoate in mineral spirits. Feed B consisted of 545.9 g isobornyl methacrylate, 698.2 g styrene, 335.9 g butyl methacrylate, 146.0 g butyl acrylate, 441.1 g hydroxyethyl methacrylate and 15.3 g acrylic acid. After the addition of the two feeds A and B were complete, the funnels were rinsed with 42.0 g and 63.1 g PM acetate, respectively, the vessel contents were allowed to reflux for an additional 30 minutes. Thereafter, heating was discontinued, 63.1 g PM acetate added and the contents of the vessel allowed to cool to ambient temperature.

The resultant product had a total solids content measured for 1 hour at 110° C. of 65.40% by weight; a timed bubble tube viscosity of 40.25 seconds; an acid value of 5.83 mg KOH/g; an APHA color of 5-10; a density of 8.61 lb/gal; had a peak molecular weight of 5801, a weight average molecular weight of 6424 and a number average molecular weight of 2156 in THF.

Coating Composition Examples

The following Examples 22-37 illustrate coating compositions employing copolymers of the present invention.

Example 23

|  | Weight (grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 15.17 |
| Hydroxy containing acrylic polymer of Example 20 | 24.18 |
| Glycidyl ester/polyol reaction product of Example 1 | 30.00 |
| Solvent Blend #7 | 40.00 |
| Pm Acetate | 10.15 |
| Sub Total | 122.93 |
| PACK 2 | |
| DESMODUR N-3400 | 23.03 |
| DESMODUR Z 4470 BA | 24.33 |
| MIBK | 2.72 |
| Sub Total | 50.08 |
| Total | 173.00 |

Example 24

|  | Weight (grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 15.17 |
| Hydroxy containing acrylic polymer of Example 20 | 24.18 |
| Glyxidyl ester/polyol reaction product of Example 3 | 30.00 |
| Solvent Blend #7 | 40.00 |
| Pm Acetate | 10.15 |
| Sub Total | 122.93 |
| PACK 2 | |
| DESMODUR N-3400 | 23.03 |
| DESMODUR Z 4470 BA | 24.33 |
| MIBK | 2.72 |
| Sub Total | 50.08 |
| Total | 173.00 |

Example 25

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 17.15 |
| Hydroxy containing acrylic polymer of Example 20 | 27.33 |
| Glycidyl Ester/polyol reaction product of Example 2 | 30.00 |
| Solvent Blend #7 | 40.00 |
| Pm Acetate | |
| Sub Total | 127.28 |
| PACK 2 | |
| DESMODUR N-3400 | 21.03 |
| DESMODUR Z 4470 BA | 22.21 |
| MIBK | 2.48 |
| Sub Total | 45.72 |
| Total | 173.00 |

Example 26

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 17.15 |
| Hydroxy containing acrylic polymer of Example 20 | 27.33 |
| Glycidyl Ester/polyol reaction product of Example 4 | 30.00 |
| Solvent Blend #7 | 40.00 |
| Pm Acetate | 9.39 |
| Sub Total | 127.28 |
| PACK 2 | |
| DESMODUR N-3400 | 21.03 |
| DESMODUR Z 4470 BA | 22.21 |
| MIBK | 2.48 |
| Sub Total | 45.72 |
| Total | 173.00 |

Example 27

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 17.15 |
| Hydroxy containing acrylic polymer of Example 20 | 27.33 |
| Glycidyl ester/polyol reaction product of Example 6 | 30.00 |

-continued

|  | Weight(grams) |
|---|---|
| Solvent Blend #7 | 40.00 |
| Pm Acetate | 9.39 |
| Sub Total | 127.28 |
| PACK 2 | |
| DESMODUR N-3400 | 21.03 |
| DESMODUR Z 4470 BA | 22.21 |
| MIBK | 2.48 |
| Sub Total | 45.72 |
| Total | 173.00 |

Example 28

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 15.17 |
| Hydroxy containing acrylic polymer of Example 20 | 24.18 |
| Glycidyl ester/polyol reaction product of Example 5 | 30.00 |
| Solvent Blend #7 | 40.00 |
| Pm Acetate | 10.15 |
| Sub Total | 122.93 |
| PACK 2 | |
| DESMODUR N-3400 | 23.03 |
| DESMODUR Z 4470 BA | 24.33 |
| MIBK | 2.72 |
| Sub Total | 50.08 |
| Total | 173.00 |

Example 29

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 17.15 |
| Hydroxy containing acrylic polymer of Example 20 | 27.33 |
| Glycidyl ester/polyol reaction product of Example 8 | 30.00 |
| Solvent Blend #7 | 40.00 |
| Pm Acetate | 9.39 |
| Sub Total | 127.28 |
| PACK 2 | |
| DESMODUR N-3400 | 21.03 |
| DESMODUR Z 4470 BA | 22.21 |
| MIBK | 2.48 |
| Sub Total | 45.72 |
| Total | 173.00 |

Example 30

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 15.17 |
| Hydroxy containing acrylic polymer of Example 20 | 24.18 |
| Glycidyl ester/polyol reaction product of Example 7 | 30.00 |
| Solvent Blend #7 | 40.00 |
| Pm Acetate | 10.15 |
| Sub Total | 122.93 |
| PACK 2 | |
| DESMODUR N-3400 | 23.03 |
| DESMODUR Z 4470 BA | 24.33 |
| MIBK | 2.72 |
| Sub Total | 50.08 |
| Total | 173.00 |

Example 31

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 15.17 |
| Hydroxy containing acrylic polymer of Example 20 | 24.18 |
| Glycidyl ester/polyol reaction product of Example 12 | 30.00 |
| Solvent Blend #7 | 40.00 |
| Pm Acetate | 10.15 |
| Sub Total | 122.93 |
| PACK 2 | |
| DESMODUR N-3400 | 23.03 |
| DESMODUR Z 4470 BA | 24.33 |
| MIBK | 2.72 |
| Sub Total | 50.08 |
| Total | 173.00 |

Example 32

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 9.02 |
| Hydroxy containing acrylic polymer of Example 20 | 14.38 |
| Glycidyl ester/polyol reaction product of Example 14 | 30.00 |

-continued

|  | Weight(grams) |
|---|---|
| Solvent Blend #7 | 40.00 |
| Pm Acetate | 12.53 |
| Sub Total | 109.35 |
| PACK 2 | |
| DESMODUR N-3400 | 29.27 |
| DESMODUR Z 4470 BA | 30.92 |
| MIBK | 3.46 |
| Sub Total | 63.64 |
| Total | 173.00 |

Example 33

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 9.02 |
| Hydroxy containing acrylic polymer of Example 20 | 14.38 |
| Glycidyl ester/polyol reaction product of Example 9 | 30.00 |
| Solvent Blend #7 | 40.00 |
| Pm Acetate | 12.53 |
| Sub Total | 109.35 |
| PACK 2 | |
| DESMODUR N-3400 | 29.27 |
| DESMODUR Z 4470 BA | 30.92 |
| MIBK | 3.46 |
| Sub Total | 3.64 |
| Total | 173.00 |

Example 34

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 9.02 |
| Hydroxy containing acrylic polymer of Example 20 | 14.38 |
| Glycidyl ester/polyol reaction product of Example 10 | 30.00 |
| Solvent Blend #7 | 40.00 |
| Pm Acetate | 12.53 |
| Sub Total | 109.35 |
| PACK 2 | |
| DESMODUR N-3400 | 29.27 |
| DESMODUR Z 4470 BA | 30.92 |
| MIBK | 3.46 |
| Sub Total | 63.64 |
| Total | 173.00 |

Example 35

|  | Weight(grams) |
|---|---|
| PACK 1 | |
| BYK 300 | 0.50 |
| DBTDL | 0.26 |
| TINUVIN 292 | 1.20 |
| CHISORB 328 | 1.00 |
| Propionic Acid | 0.46 |
| Hydroxy containing acrylic polymer of Example 19 | 9.02 |
| Hydroxy containing acrylic polymer of Example 20 | 14.38 |
| Glycidyl ester/polyol reaction product of Example 12 | 30.00 |
| Solvent Blend #7 | 40.00 |
| Pm Acetate | 12.53 |
| Sub Total | 109.35 |
| PACK 2 | |
| DESMODUR N-3400 | 29.27 |
| DESMODUR Z 4470 BA | 30.92 |
| MIBK | 3.46 |
| Sub Total | 63.64 |
| Total | 173.00 |

Example 36

|  | Weight(grams) |
|---|---|
| PACK 1 | |
| BYK 300 | 0.50 |
| DBTDL | 0.20 |
| TINUVIN 292 | 1.20 |
| CHISORB 328 | 1.00 |
| Hydroxy containing acrylic polymer of Example 19 | 31.87 |
| Hydroxy containing acrylic polymer of Example 21 | 27.58 |
| Glycidyl ester/polyol reaction product of Example 16 | 20.99 |
| Solvent Blend #7 | 30.00 |
| Pm Acetate | 15.77 |
| Sub Total | 129.11 |
| PACK 2 | |
| DESMODUR N-3400 | 20.18 |
| DESMODUR Z 4470 BA | 21.32 |
| MIBK | 2.38 |
| Sub Total | 43.89 |
| Total | 173.00 |

Example 37

|  | Weight(grams) |
|---|---|
| PACK 1 | |
| BYK 300 | 0.50 |
| DBTDL | 0.20 |
| TINUVIN 292 | 1.20 |
| CHISORB 328 | 1.00 |
| Hydroxy containing acrylic polymer of Example 22 | 40.87 |
| Hydroxy containing acrylic polymer of Example 20 | 11.58 |
| Glycidyl ester/polyol reaction product of Example 15 | 26.73 |
| Solvent Blend #7 | 29.99 |

-continued

| | Weight(grams) |
|---|---|
| Pm Acetate | 16.95 |
| Sub Total | 129.02 |
| PACK 2 | |
| DESMODUR N-3400 | 20.23 |
| DESMODUR Z 4470 BA | 21.36 |
| MIBK | 2.38 |
| Sub Total | 43.98 |
| Total | 173.00 |

The Examples above include materials that may be cited as a tradename or are otherwise not clear as the nature of the material. The following definitions are provided to clarify such names:

Amyl Propionate (pentyl propionate) solvent is commercially available from Dow Chemical Co. having a place of business in Midland, Mich.

BYK 300 flow additive is commercially available from Byk Chemie having a place of business in Wallingford, Conn.

Butyl Acetate urethane grade solvent is commercially available from Eastman Chemical Co. having a place of business in Kingsport, Tenn.

BUTYL CELLOSOLVE Acetate (EB Acetate) solvent is commercially available from Eastman Chemical Co. having a place of business in Kingsport, Tenn.

CHISORB 328 UV absorber is commercially available from CHITEC Chemical Co. having a place of business in Taiwan, R.O.C.

Desmodur N-3400 aliphatic polyisocyanate is commercially available from Bayer having a place of business in Pittsburgh, Pa.

Desmodur Z 4470 BA aliphatic polyisocyanate is commercially available from Bayer having a place of business in Pittsburgh, Pa.

DBTDL (dibuty tin dilaurate) DABCO T-12 is commercially available from Air Products having a place of business in Allentown, Pa.

MIBK (methyl isobutyl ketone) solvent is commercially available from Eastman Chemical Co. having a place of business in Kingsport, Tenn.

Propionic Acid is commercially available from Aldrich Chemical Co. having a place of business in Milwaukee, Wis.

PM Acetate solvent is commercially available from Eastman Chemical Co. having a place of business in Kingsport, Tenn.

Solvent Blend #7 used in the foregoing Examples has the following formulation:

| Component | Weight(grams) |
|---|---|
| BUTYL CELLOSOLVE ACETATE | 8.00 |
| Amyl Propionate | 24.00 |
| SOLVESSO 100 | 16.00 |
| Butyl Acetate | 12.00 |
| MIBK | 40.00 |
| Total | 100.00 |

SOLVESSO 100, aromatic solvent, is commercially available from Exxon Mobil Corp. having a place of business in Houston, Tex.

TINUVIN 292, hindered amine light stabilizer is commercially available from CIBA Specialty Chemical Corp. having a place of business in Tarrytown, N.Y.

The compositions of Examples #23-37 were sprayed applied with a DeVilbiss GTI Millennium gravity spray gun over the following substrate:

An APR43741 coated metal substrate from ACT Laboratories, Inc. Hillsdale, Mich. was sanded with 600 grit paper. PPG Global BC color number 3964 basecoat, available from PPG Industries, Pittsburgh Pa., was then applied to the sanded substrate and given a solvent flash at room temperature for thirty (30) minutes. The clearcoat of Examples 23-37 was applied to the basecoat and cured at room temperature. The clearcoat had a dry film thickness of 2 to 3 mils. The following Table 2 illustrates the physical properties of the coating compositions of the foregoing Examples:

TABLE 2

| Coating Composition Example # | Viscosity Initial[1] (CPS) | Viscosity at 1 hr[1] (CPS) | Dust Time (Minutes)[2] | 20° Gloss[3] | Konig Hardness at 24 hours[4] | Konig Hardness at 1 Week[4] |
|---|---|---|---|---|---|---|
| Example #23 | 23.7 | 60.1 | 58 | 85 | 28 | 43 |
| Example #24 | 22.7 | 55.9 | 78 | 86 | 33 | 50 |
| Example #25 | 26.7 | 68.1 | 63 | 86 | 25 | 40 |
| Example #26 | 26.7 | 65.3 | 68 | 86 | 27 | 43 |
| Example #27 | 30.1 | 86.5 | 55 | 87 | 27 | 42 |
| Example #28 | 26.5 | 96.9 | 46 | 87 | 34 | 49 |
| Example #29 | 29.1 | 93.4 | 49 | 86 | 27 | 42 |
| Example #30 | 26.5 | 77.2 | 52 | 86 | 28 | 43 |
| Example #31 | 32.2 | 83 | 42 | 87 | 24 | 36 |
| Example #32 | 20.2 | 70 | 48 | 86 | 46 | 64 |
| Example #33 | 18.4 | 60 | 54 | 86 | 39 | 56 |
| Example #34 | 18.5 | 59.6 | 59 | 86 | 36 | 61 |
| Example #35 | 22.9 | 119 | 37 | 87 | 38 | 53 |
| Example #36 | 48.5 | 300 | 35 | 90 | | 38 |
| Example #37 | 44.5 | 258 | 35 | 91 | | 32 |

[1]Viscosity was measured at 60 rpm by a BROOKFIELD Viscometer Model LVT right after mixing the formula components (initial) and again measured at 1 hour after mixing.
[2]Dust time was measured by placing a cotton ball on the coating at various times after applying and recording the time the cotton ball cleanly falls off after the panel is inverted.
[3]Gloss was measured by a BYK-Gardner Micro-TRI-Glossmeter.
[4]Konig hardness was measured by a BYK-Gardner Pendulum Hardness Tester.

Whereas particular embodiments of this invention have been described above for purposes of illustration, it will be evident to those skilled in the art that numerous variations of the details of the present invention may be made without departing from the invention as defined in the appended claims.

We claim:

1. A copolymer having a molecular weight distribution greater than 1.10 produced from reacting a glycidyl ester and/or ether with a polyol comprising a functionality of at least 2 wherein the molar ratio of glycidyl ester and/or ether to polyol is at least 3:1 and wherein at least 50% by weight of the copolymer comprises a minimum of 3n+X repeating units, wherein n is the molecular weight of the glycidyl ester and or ether monomer unit, and X is the molecular weight of the polyol monomer unit.

2. The copolymer according to claim 1 wherein less than 50% of the copolymer includes polymeric units having the same molecular weight.

3. The copolymer of claim 1 having a number average molecular weight ($M_n$) of at least 500 g/mol.

4. The copolymer of claim 1 wherein the glycidyl ester comprises a $C_5$-$C_{12}$ branched aliphatic acid.

5. The copolymer of claim 1 wherein the polyol has a number average molecular weight ($M_n$) of less than 300.

6. The copolymer of claim 5 wherein said polyol comprises neopentyl glycol, 2-ethyl-1, 3-hexane diol, cyclohexane di-methanol, trimethyolpropane, tris(hydroxyethyl)isocyanurate, and/or pentaerythritol.

7. The copolymer of claim 1 wherein said polyol comprises a functionality of 2 to 16.

8. The copolymer of claim 7 wherein said polyol comprises a functionality 2 to 5.

9. The copolymer of claim 1 having a hydroxyl value of 50 to 300.

10. A process for preparing a copolymer having a molecular weight distribution greater than 1.10 comprising reacting in a molar ratio of at least 3:1 a glycidyl ester and/or ether with a polyol having a functionality of at least 2 to form a copolymer wherein at least 50% by weight of the copolymer comprises a minimum of 3n+X repeating units, wherein n is the molecular weight of the glycidyl ester and or ether monomer unit, and X is the molecular weight of the polyol monomer unit.

11. The process of claim 10 wherein less than 50% of the copolymer includes polymeric units having the same molecular weight.

12. The process of claim 10 wherein the copolymer has a number average molecular weight ($M_n$) of least 500 g/mol.

13. The process of claim 10 wherein the glycidyl ester is a C5-C12 branched aliphatic acid.

14. The process of claim 10 wherein the polyol has a $M_n$ of less than 300.

15. The process of claim 14 wherein said polyol comprises at least one polyol chosen from neopentyl glycol, 2-ethyl-1, 3-hexane diol, cyclohexane di-methanol, trimethyolpropane, tris(hydroxyethyl)isocyanurate, and pentaerythritol.

16. The process of claim 10 wherein said polyol comprises a functionality of at least 2 to about 16.

17. The process of claim 16 wherein said polyol comprises a functionality ranging from at least about 2 to about 5.

18. A coating composition comprising:
  a. the copolymer of claim 1 having reactive functional groups; and
  b. a curing agent having functional groups reactive with the functional groups of the copolymer.

19. The coating composition of claim 18 further comprising an additional component having functional groups reactive with the functional groups of the curing agent and/or the copolymer.

20. The coating composition of claim 19 wherein said additional component comprises a polyester, an acrylic polymer, and/or a polyurethane.

21. The coating composition of claim 18 wherein said curing agent comprises a polyisocyanate and/or an anhydride.

22. The coating composition of claim 18 wherein the composition is a two-component system, wherein one component comprises the copolymer and the second component comprises said curing agent.

23. The coating composition of claim 18 wherein the curing agent component comprises a blocked polyisocyanate or an aminoplast.

24. The coating composition of claim 23 wherein the composition is a one-component system.

* * * * *